US009819929B2

(12) United States Patent
Kimmel et al.

(10) Patent No.: US 9,819,929 B2
(45) Date of Patent: *Nov. 14, 2017

(54) CALIBRATION OF A THREE-DIMENSIONAL ACQUISITION SYSTEM

(71) Applicant: INTEL CORPORATION, Santa Clara, CA (US)

(72) Inventors: Ron Kimmel, Haifa (IL); Barak Freedman, Yokneam (IL); Alex Bronstein, Haifa (IL); Michael Bronstein, Lugano (CH); Sagi Ben Moshe, Kiryat Byalik (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/251,578

(22) Filed: Aug. 30, 2016

(65) Prior Publication Data
US 2016/0373727 A1  Dec. 22, 2016

Related U.S. Application Data

(63) Continuation of application No. 14/104,242, filed on Dec. 12, 2013, now Pat. No. 9,467,680.

(51) Int. Cl.
*H04N 13/04* (2006.01)
*H04N 13/02* (2006.01)
(Continued)

(52) U.S. Cl.
CPC ......... *H04N 13/0246* (2013.01); *G06T 7/521* (2017.01); *G06T 7/80* (2017.01);
(Continued)

(58) Field of Classification Search
CPC ............. H04N 13/0497; H04N 9/3197; H04N 13/0246; H04N 5/357
(Continued)

(56) References Cited

U.S. PATENT DOCUMENTS 6,664,537 B2  12/2003  Engelhardt et al.
7,046,266 B1   5/2006  Retschke et al.
(Continued)

FOREIGN PATENT DOCUMENTS

CN    1308837 A    8/2001
CN  101995657 A    3/2011
(Continued)

OTHER PUBLICATIONS

Notice of Final Rejection mailed Nov. 24, 2016, issued in corresponding Korean Patent Application No. 2014-7036593, 9 pages.
(Continued)

*Primary Examiner* — Thai Tran
*Assistant Examiner* — Mishawn Hunter
(74) *Attorney, Agent, or Firm* — Schwabe, Williamson & Wyatt, P.C.

(57) ABSTRACT

Embodiments of the present disclosure provide techniques and configurations for an optoelectronic three-dimensional object acquisition assembly configured to correct image distortions. In one instance, the assembly may comprise a first device configured to project a light pattern on an object at a determined angle; a second device configured to capture a first image of the object illuminated with the projected light pattern; a third device configured to capture a second image of the object; and a controller coupled to the first, second, and third devices and configured to reconstruct an image of the object from geometric parameters of the object obtained from the first image, and to correct distortions in the reconstructed image caused by a variation of the determined angle of the light pattern projection, based at least in part on the first and second images of the object. Other embodiments may be described and/or claimed.

21 Claims, 4 Drawing Sheets

(51) Int. Cl.
| | |
|---|---|
| *H04N 5/357* | (2011.01) |
| *H04N 5/225* | (2006.01) |
| *H04N 5/33* | (2006.01) |
| *H04N 13/00* | (2006.01) |
| *G06T 7/80* | (2017.01) |
| *G06T 7/521* | (2017.01) |

(52) U.S. Cl.
CPC ............ *H04N 5/2256* (2013.01); *H04N 5/33* (2013.01); *H04N 5/332* (2013.01); *H04N 5/357* (2013.01); *H04N 13/0051* (2013.01); *H04N 13/025* (2013.01); *H04N 13/0239* (2013.01); *H04N 13/0253* (2013.01); *H04N 13/0296* (2013.01); *G06T 2207/10024* (2013.01); *G06T 2207/10028* (2013.01); *G06T 2207/10048* (2013.01)

(58) Field of Classification Search
USPC .......................................... 348/51, 744, 745
See application file for complete search history.

(56) References Cited

U.S. PATENT DOCUMENTS

| | | |
|---|---|---|
| 7,573,022 B2 | 8/2009 | Choo et al. |
| 7,756,323 B2 | 7/2010 | Kimmel |
| 8,014,002 B2 | 9/2011 | Keshavmurthy et al. |
| 2005/0174579 A1 | 8/2005 | Notni et al. |
| 2007/0115484 A1 | 5/2007 | Huang et al. |
| 2008/0278566 A1 | 11/2008 | Towner et al. |
| 2009/0262363 A1 | 10/2009 | Keshavmurthy et al. |
| 2010/0067007 A1 | 3/2010 | Videen et al. |
| 2010/0067554 A1 | 3/2010 | Wysocki et al. |
| 2010/0207938 A1 | 8/2010 | Yau et al. |
| 2011/0025860 A1 | 2/2011 | Katougi et al. |
| 2012/0001961 A1 | 1/2012 | Nishikawa et al. |
| 2012/0200829 A1 | 8/2012 | Bronstein et al. |
| 2013/0001834 A1 | 1/2013 | El-Siblani et al. |
| 2013/0083384 A1 | 4/2013 | Yamagata et al. |
| 2013/0141734 A1 | 6/2013 | Aoki |
| 2014/0002337 A1 | 1/2014 | Bandringa et al. |
| 2015/0161818 A1 | 6/2015 | Komenczi et al. |

FOREIGN PATENT DOCUMENTS

| | | |
|---|---|---|
| CN | 201974159 A | 9/2011 |
| CN | 103033143 A | 4/2013 |
| CN | 103066487 A | 4/2013 |
| JP | 2003061936 A | 3/2003 |
| JP | 2003329955 A | 11/2003 |
| JP | 2007010354 A | 1/2007 |
| JP | 2012202803 A | 10/2012 |
| KR | 1020100051139 A | 5/2010 |
| TW | 479444 B | 3/2002 |
| WO | 2013054814 A1 | 4/2013 |

OTHER PUBLICATIONS

Supplementary European Search Report mailed Dec. 23, 2016, issued in corresponding European Patent Application No. 13888254.3, 10 pages.
Final Rejection with Dismissal of Amendment dated Jan. 23, 2017, issued in corresponding Korean Patent Application No. 2014-7036593, 10 pages.
TW Office Action for TW Application No. 103119562, dated Jun. 25, 2015, 13 pages.
Notice of Reason(s) for Rejection dated Dec. 15, 2015, issued in corresponding Japanese Patent Application No. 2015-524290, 6 pages.
International Preliminary Report on Patentability dated Jan. 7, 2016, issued in corresponding International Application No. PCT/US2013/048611, 9 pages.
Non-Final Office Action dated Dec. 18, 2015, issued in U.S. Appl. No. 14/128,915, filed Dec. 23, 2013.
International Search Report for PCT Application No. PCT/US2014/066460, dated Mar. 13, 2015, 15 pages.
O. Rubinstein, et al.,3D color video camera, InProc. of Workshop on 3D Digital Imaging and Modeling(3DIM), 2009.
R. Y. Tsai., "An efficient and accurate camera calibration technique for 3D machine vision," in IEEE Conference on Computer Vision and Pattern Recognition, pp. 364-374, Jun. 1986.
A. Bronstein, et al., "Calibration for a one dimensional coded light stereo 3D acquisition system," InVision/Intel provisional patent application 2011.
Milanovic et al., "Memseye for Optical 3D Tracking and Imaging Applications", Transducers 2011 Conference, Jun. 5-9, 2011, Beijing, China, 4 pages.
International Search Report and Written Opinion dated Mar. 21, 2014 for International Application No. PCT/US2013/048611, 12 pages.
First Office Action dated Feb. 19, 2016, issued in corresponding Chinese Patent Application No. 201380033389.3, 8 pages.
Notice of Preliminary Rejection dated May 17, 2016, issued in corresponding Korean Patent Application No. 2014-7036593, 20 pages.
International Preliminary Report on Patentability dated Jun. 23, 2016, issued in corresponding International Application No. PCT/US2014/066460.
Lecture 16. Stereo and 3D Vision. © UW CSE vision faculty, https://courses.cs.washington.edu/courses/cse455/09wi/.../lect16.pdf., <<last visited Jun. 20, 2016,>> 53 pages.
Developing for the Intel® RealSense™ Camera (SR300), https://software.intel.com/en-us/realsense/sr300camera, <<last visited May 9, 2016>> 3 pages.
Inilabs, Dynamic Vision Sensor <<http://inilabs.com/products/dynamic-vision-sensors/>> last visited Jul. 27, 2016, 7 pages.
Lecture 09: Stereo Algorithms, Robert Collins, Robert Collins, <<http://www.cse.psu.edu/~rtc12/CSE486/lecture09.pdf>>, last visited Jul. 27, 2016.
U.S. Appl. No. 15/187,738 entitled "Depth Image Provision Apparatus and Method," filed Jun. 20, 2016.
U.S. Appl. No. 15/190,031 entitled "Depth Image Provision Apparatus and Method," filed Jun. 22, 2016.
Roger Y. Tsai, "A versatile Camera Calibration Technique for High-Accuracy 3D Machine Vision Metrology Using Off-the-Shelf TV Cameras and Lenses," IEEE Journal of Robotics and Automation, vol. RA-3, No. 4, Aug. 1987, pp. 323-344.
Third Office Action dated Apr. 28, 2017, issued in related Chinese Patent Application No. 201380033389.3, 42 pages.
Communication pursuant to Article 94(3) EPC, dated Apr. 5, 2017, issued in corresponding European Patent Application No. 13888254.3, 5 pages.

CALIBRATION OF A THREE-DIMENSIONAL ACQUISITION SYSTEM

CROSS-REFERENCE TO RELATED APPLICATION

This application is a continuation of U.S. application Ser. No. 14/104,242 filed Dec. 12, 2013, and entitled "CALIBRATION OF A THREE-DIMENSIONAL ACQUISITION SYSTEM," the disclosure of which is hereby incorporated by reference herein in its entirety for all purposes.

FIELD

Embodiments of the present disclosure generally relate to the field of opto-electronics, and more particularly, to calibration techniques applied to a three-dimensional acquisition system.

BACKGROUND

Calibration of an optoelectronic three-dimensional (3D) acquisition or reconstruction system is typically done at assembly time. Subsequent calibrations of the system may be needed due to the system's deviation from initial calibration due to various external factors, such as temperature, humidity or barometric pressure changes, or displacement of sensing and/or projecting devices included in the system. However, these subsequent calibrations may not always be performed when needed, for example, in response to the distortions occurring in the acquisition system due to external factors. Furthermore, these calibrations may have to be done manually and may require using calibration objects with known dimensions that may be used to correct the system for known measures between given detectable features of the object.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure include techniques and configurations for optoelectronic assembly for 3D object acquisition and distortion compensation.

In the following detailed description, reference is made to the accompanying drawings which form a part hereof, wherein like numerals designate like parts throughout, and in which are shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

Figure 1:
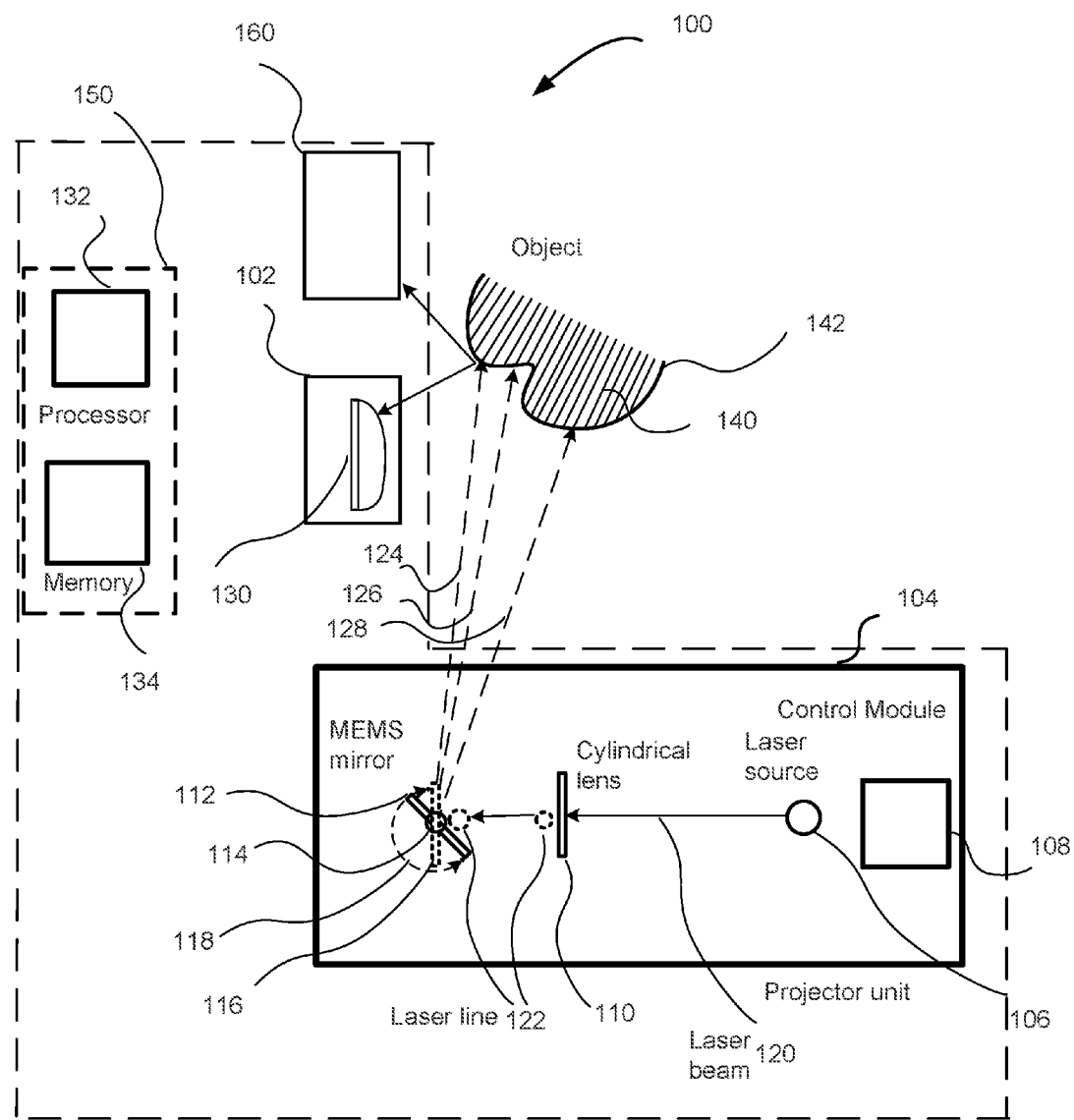
FIG. 1 schematically illustrates an example device for three-dimensional (3D) object acquisition and distortion compensation, in accordance with some embodiments.

FIG. 1 schematically illustrates an example device 100 for a three-dimensional (3D) object acquisition and distortion compensation in accordance with some embodiments of the present disclosure. In some embodiments, the device 100 may include a 3D scanner, a 3D camera or any other device configured for a 3D object acquisition. In some embodiments, as illustrated, the device 100 may include an image capturing device 102 (e.g., a digital camera) and a projector unit 104, such as a laser projector or laser scanner, having a number of components. In some embodiments, the digital camera 102 may comprise an infrared (IR) camera, and the projector unit 104 may comprise an IR projector.

The device 100 may further include laser arrangement that includes a laser source 106, such as a laser device configured to provide a laser beam 120, coupled with a control module 108. The control module 108 may be implemented as a software or hardware module, or a combination thereof. The control module 108 may be configured to control (e.g., modulate) an optical power of the laser beam 120 provided by the laser source 106.

The laser arrangement may further include an optical lens 110. The laser source 106 and the optical lens 110 may be configured so that modulated laser beam 120 may pass through the optical lens 110. The lens 110 may be a lens configured to focus light which passes through on to a line instead of on to a point, in contrast to a spherical lens, for example. In some embodiments, the lens 110 may be a cylindrical lens. Accordingly, the lens 110 may be configured to transform the laser beam 120 passing through the lens 110 into a laser line 122. For better understanding of a spatial disposition of the laser line 122 note that the laser line 122 may be disposed on a plane that is perpendicular to the plane of FIG. 1. Accordingly, the laser line 122 formed from the laser beam 120 passing through the lens 110 is shown as perpendicular to the plane of FIG. 1.

The laser line 122 may be received and deflected by a tiltable or rotatable mirror 112 of device 100, forming, during mirror tilting, multiple laser planes, such as ones indicated by numerals 124, 126, and 128. In some embodiments, the mirror 112 may be a micro-electromechanical system (MEMS) scanning mirror. In some embodiments, a mirror surface of MEMS scanning mirror 112 may be made of silicon (Si), although in different materials providing required properties related to scanning mirror reflection qualities may be utilized in various embodiments. In some embodiments, the mirror 112 may be a single-axis mirror, while in other embodiments the mirror 112 may be a two-axis MEMS scanning mirror or a two-mirror system. In some embodiments, the MEMS scanning mirror 112 may be configured to be at least partially tiltable (rotatable) around the axis 114, in order to deflect the laser line 122 so as to produce light patterns 140 projected by the mirror 112 to an object 142 and defined by the laser planes 124, 126, 128. For example, the mirror 112 may be tiltable, as shown by 118, at least from its resting position indicated by the numeral 116 to a position indicated by 112, in order to provide a scan angle that ensures a desired dimension for the light patterns defined by the exit laser planes 124, 126, 128. The axis 114 may be substantially parallel to the laser line 122, and the MEMS scanning mirror 112 may be disposed within a plane that is perpendicular to the plane of FIG. 1 and may be tiltable around the axis 114, as shown. Accordingly, the laser planes 124, 126, 128 may also be substantially perpendicular to the plane of FIG. 1. In some embodiments, the control module 108 may be configured to control the tilting of the MEMS scanning mirror 112.

It should be understood by one skilled in the art that the projector unit 104 configured to project the light pattern 140 as described above may comprise a one-dimensional coded projector and the light patterns 140 comprise one-dimensional coded light patterns, e.g., the patterns that may be described by one-dimensional or linear codes. The light patterns 140 formed by the laser planes 124, 126, 128 on a surface of the object 142 may be received by the image capturing device 102 and sensed (e.g., read) by a sensor 130 of the image capturing device 102. Based on the readings of the multiple scans of the light patterns accumulated during a sensing cycle of the sensor 130, the device 100 may be configured to reconstruct the shape of the object 142.

In some embodiments, the device 100 may further include another image capturing device, such as digital camera 160. In some embodiments, the digital camera 160 may have a resolution that is different than that of the digital camera 102. For example, the digital camera 102 may be a multi-chromatic camera, such as red, green, and blue (RGB) camera configured to capture texture images of the object 140. The object images captured by the digital camera 160 may be used to identify image distortions, such as misalignment of the geometric parameters of the object reconstructed using the images captured by camera 102, and to compensate for the identified distortions, as described in greater detail below.

The device 100 may include the controller 150 that may be associated with the control module 108 described above. The controller 150 may include a processor 132, coupled with a memory 134 configured to enable the above-noted and other functionalities of the device 100. For example, the processor 132 may be configured with executable instructions stored in the memory 134 to enable operations of a laser source 106, control module 108, and the MEMS scanning mirror 112 as described herein. The controller 150 may be configured to reconstruct the object 142 based on the images captured by the digital camera 102, for example, using epipolar geometry techniques or other techniques used for 3D image reconstruction. The controller 150 may be further configured to dynamically calibrate the device 100 to correct distortions in the reconstructed image of the object 142 that may be caused, for example, by variations of the angle of the light pattern projection by the MEMS scanning mirror 112 that may be caused by various external factors (e.g., barometric pressure, temperature, humidity, or displacement of the MEMS scanning mirror 112).

In some embodiments, the device 100 described herein may further include additional components. For example, the processor 132, the memory 134, and/or other components of the controller 150 may comport with a processor-based system that may be a part of, or include, the device 100, in accordance with some embodiments. The memory 134 for one embodiment may include any suitable volatile memory, such as suitable Dynamic Random Access Memory (DRAM), for example.

In some embodiments, the memory 134 may include instructions that, when executed on the processor 132, cause the device 100 to perform operations described herein. In some embodiments, the control module 108 may be implemented as a software component stored, e.g., in the memory 134 and configured to execute on the processor 132. In some embodiments, the control module 108 may be implemented as a combination of a software and hardware components. In some embodiments, the control module 108 may include a hardware implementation.

The processor 132, memory 134, other components (not shown), image capturing device 102, and projector unit 104 may be coupled with one or more interfaces (not shown) configured to facilitate information exchange among the above-mentioned components. Communications interface(s) (not shown) may provide an interface for the device 100 to communicate over one or more wired or wireless network(s) and/or with any other suitable device. In various embodiments, the device 100 may be included to or associated with, but is not limited to, a server, a workstation, a desktop computing device, or a mobile computing device (e.g., a laptop computing device, a handheld computing device, a handset, a tablet, a smartphone, a netbook, ultra-book, etc.).

In various embodiments, the device 100 may have more or less components, and/or different architectures. For example, in some embodiments, the device 100 may include one or more of a camera, a keyboard, display such as a liquid crystal display (LCD) screen (including touch screen displays), a touch screen controller, non-volatile memory port, antenna or multiple antennas, graphics chip, ASIC, speaker(s), a battery, an audio codec, a video codec, a power amplifier, a global positioning system (GPS) device, a compass, an accelerometer, a gyroscope, and the like. In various embodiments, the device 100 may have more or less components, and/or different architectures. In various embodiments, techniques and configurations described herein may be used in a variety of systems that benefit from the principles described herein such as optoelectronic, electro-optical, MEMS devices and systems, and the like.

In summary, the device 100 may comprise an optoelectronic assembly for 3D object acquisition and distortion compensation that may include a projector unit 104, a digital camera (e.g., IR camera) 102, another digital camera (e.g., multi-chromatic camera) 160, and a controller 150 configured to operate the device 100 according to the embodiments described herein. However, the above assembly configuration is described for illustration purposes only, and is should not be limiting to the present disclosure. Various configurations of an assembly for a 3D object acquisition may be used to implement the embodiments described herein. For example, an assembly for a 3D object acquisition configured to enable the reconstructed object distortion corrections may include three digital cameras, two of which may be used to reconstruct a 3D image of an object, and the third camera (e.g. with a resolution that is different than those of the two cameras) may be used to capture images of the object in order to identify image distortions in the reconstructed object and to compensate for identified distortions.

Figure 2:
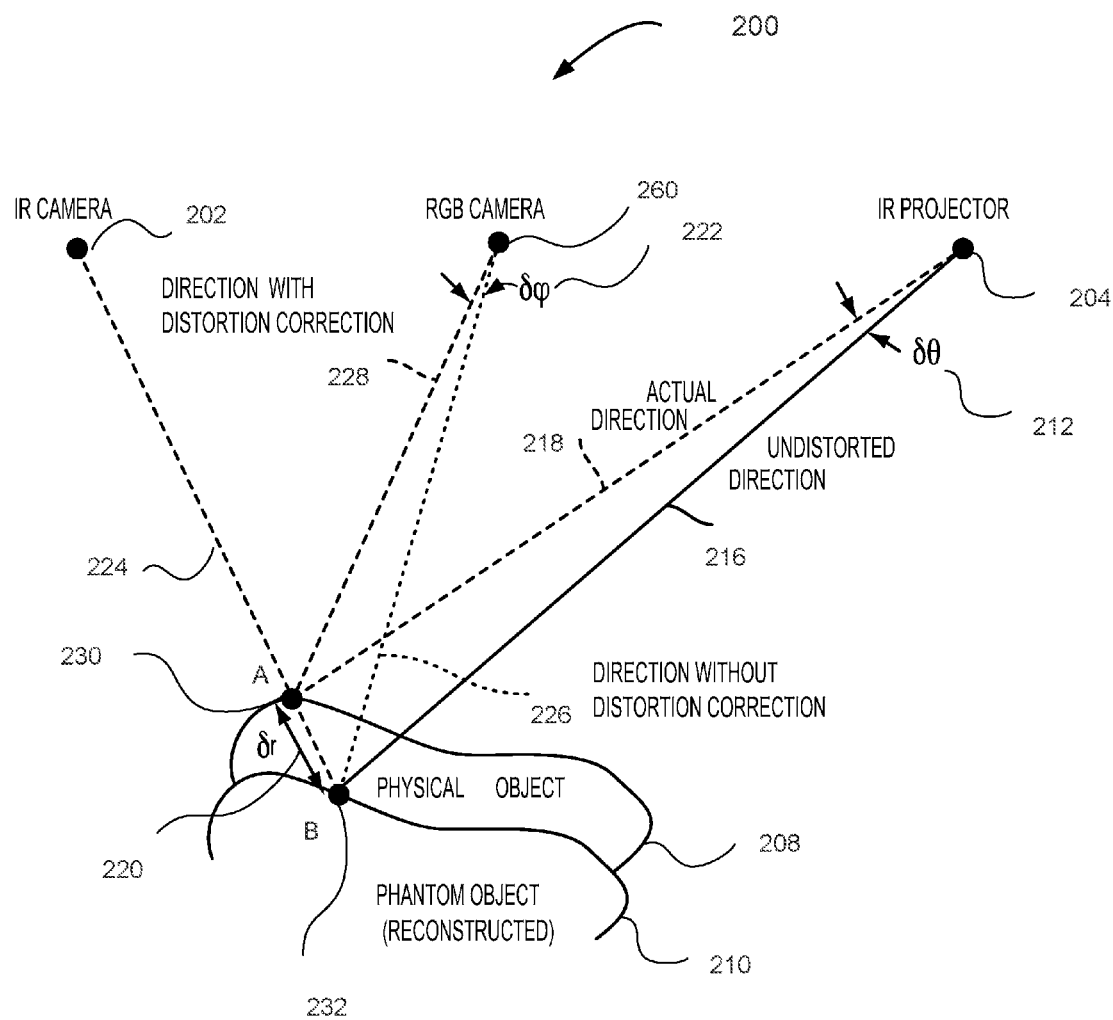
FIG. 2 is a diagram illustrating an example optoelectronic assembly for 3D object acquisition and distortion compensation in operation, in accordance with some embodiments.

FIG. 2 is an example diagram 200 illustrating an example optoelectronic assembly for 3D object acquisition and distortion compensation in operation, in accordance with some embodiments. As described above, the example optoelectronic assembly for 3D object acquisition and distortion compensation may include a camera 202 (e.g., IR camera) similar to camera 102, a projector 204 (e.g., IR projector) similar to projector unit 104, and another camera 260 (e.g., multi-chromatic camera such as RGB camera) similar to camera 160. As described above, in a different configuration, the example optoelectronic assembly may include another image capturing device (e.g., a camera) instead of the projector 204, which may be used for 3D object reconstruction along with the camera 202. Accordingly, while the description below discusses an operation of the optoelectronic assembly including the devices 202, 204, and 260, embodiments of an optoelectronic assembly having a camera instead of the projector 204 and configured to enable 3D object acquisition and distortion compensation may also be contemplated.

In operation, the projector 204 may project light (e.g., one-dimensional coded light patterns) on an object 208. The camera 202 may capture object 208 images, as described in reference to FIG. 1. Assume the projector 204 (e.g., a projector mirror similar to MEMS scanning mirror 112) is displaced, such as shifted, skewed, moved, or otherwise rotated away from its initial position (e.g., due to changes in barometric pressure, humidity, temperature, or mechanical damage). It will be appreciated that among the components 202 and 204, the projector 204 may be most sensitive to external factors listed above. Accordingly, this document addresses the problem of correcting distortions caused by accidental displacement of the projector 204.

As a result of the displacement of the projector 204 (for example, due to imprecise assembly of the system, thermal deformation, etc.) or the projector components (in case of a MEMS projector, the angle swapped by the mirror may change due to change in barometric pressure), a projection angle variation $\delta\theta$ 212 may occur between an undistorted direction of projector 204's projection 216 on the object 208 and actual direction of projection 218 on the object 208. This angle variation $\delta\theta$ 212 may result in a corresponding range shift $\delta r$ 220 of the direction of view of the camera 260 along the direction of view 224 of camera 202. As shown, the range shift (displacement) $\delta r$ 220 may be formed by a misalignment $\delta\phi$ between the direction of view of the camera 260 without the distortion correction 226 and the direction of view of the camera 260 with the distortion correction 228. In other words, the actual direction of projection 218 of the projector 204 may point at a spot A (230) on the physical object 208, while the direction of view 226 without distortion correction of the camera 260 may point at a spot B (232) on a phantom object 210, causing the displacement $\delta r$ 220 and corresponding distortion of the reconstructed object 210 due to the displacement $\delta r$ 220.

Observing the same spot B 232 by means of an additional camera 260 (for example, an RGB camera used for texture mapping in some embodiments), it is possible to estimate the misalignment $\delta\phi$ 222, which, in turn, may allow a controller, for example, controller 150, to compute the displacement $\delta r$ 220 and to compensate for the corresponding angle variation $\delta\theta$ 212, thus compensating for a distortion caused by the change of position of the projector 204. For example, the object 208 image may be reconstructed, e.g., by applying epipolar geometry (or other 3D object reconstruction techniques providing geometric relations between 3D objects and their projections on the 2D images) to the images captured by the camera 202 of the object with the light pattern projected to it via the actual direction of projection 218. Due to the angle variation $\delta\theta$ 212 the reconstructed image may have distortions in the reconstructed geometric parameters of the object 208. The image (or images) of the object 208 may also be captured by the camera 260. The geometric parameters derived from these images may be compared with the geometric parameters of the object in the reconstructed image and a mismatch of corresponding features in the texture image and the reconstructed image may be determined. At least one corrective parameter to be used in the reconstructed image to compensate for the mismatch may be calculated.

For example, the coordinates of an object captured by the camera 202 may be expressed by the following projection in homogeneous (projective) coordinates, which maps a three-dimensional point in the 3D world coordinates (expressed as a four-dimensional vector in homogeneous representation, the extra fourth dimension allowing to equivalently express points and directions):

$$\begin{bmatrix} X_c \\ 1 \end{bmatrix} = \alpha K_c [I \ O] \begin{bmatrix} X_w \\ 1 \end{bmatrix} = \alpha [K_c \ O] X \quad \text{Equation 1}$$

where

Xc is a set of two-dimensional coordinates of of a given point on the object derived from an image taken by camera 202 (e.g., IR camera); (2 dimensional, $\in \mathbb{R}^2$) in IR-camera coordinate system, Kc is a 3×3 IR-camera intrinsic matrix, which may be obtained from the IR-camera intrinsic calibration, Xw is a set of three-dimensional world coordinates of a given point on the object, X is the homogenous four-dimensional representation of the world coordinates $X=[X_w, 1]^T$ of a given point on the object, α is a global scalar scaling factor, I is a 3×3 identity matrix, and O is a 3×1 vector of zeros.

The 3×4 projection matrix $K_c[I \ O]=[K_c \ O]$ maps the world coordinates of a given point on the object in homogeneous representation to the camera system of coordinates in homogeneous representation.

The coordinates of the object captured by camera 260 (e.g., RGB camera) may be obtained by a similar projection formula, where one has to account for a relative position of camera 260 w.r.t. camera 202 (expressed as a rotation and translation):

$$\begin{bmatrix} X_r \\ 1 \end{bmatrix} = \alpha K_r [I \ O] \begin{bmatrix} R_{rc} & t_{rc} \\ O & 1 \end{bmatrix} X = \alpha Q X \quad \text{Equation 2}$$

where
- $X_r$ is a set of two-dimensional RGB-camera coordinates of a given point on the object (2 dimensional, $\in \mathbb{R}^2$),
- $K_r$ is a 3×3 RGB-camera intrinsic matrix, $$\begin{bmatrix} R_{rc} & t_{rc} \\ 0 & 1 \end{bmatrix}$$

is a 4×4 transformation expressed in homogeneous coordinates, representing the geometric relation of the RGB texture camera and the IR camera, comprising a 3×3 rotation matrix $R_{rc}$, and a 3×1 translation vector $t_{rc}$,
- X are the world coordinates (expressed in homogeneous representation) of a given point on the object, and
- Q is a 3×4 texture camera matrix (intrinsic and extrinsic).

Kr may be obtained from the RGB-camera intrinsic calibration, $R_{rc}$ $t_{rc}$ from extrinsic calibration, or computed knowing the relative placement of the two cameras in the system assembly.

Assuming that the projector 204 (e.g., IR projector) projects a pattern that changes in one direction (e.g. vertical or horizontal rectangular-shaped patterns of different width changing in time, which form a binary code), it may be regarded as a one-dimensional camera, and expressed using a similar projection formula:

$$\begin{bmatrix} x_p \\ 1 \end{bmatrix} = \alpha K_p \begin{bmatrix} R_{pc} & t_{pc} \\ 0 & 1 \end{bmatrix} X = \alpha PX \quad \text{Equation 3}$$

where
- $x_p$ are projector coordinates of a given point on the object (1 dimensional, $\alpha_p \in \mathbb{R}^1$),
- $K_p$ is a 2×3 projector intrinsic matrix, $$\begin{bmatrix} R_{pc} & t_{pc} \\ 0 & 1 \end{bmatrix}$$

is a 3×4 projector transformation relative to the IR camera expressed in homogeneous coordinates, comprising a 3×3 rotation matrix $R_{pc}$, and a 3×1 translation vector $t_{pc}$, and
- P is a 2×4 projector matrix (intrinsic and extrinsic).

The projector matrix may be calculated as follows:

$$P = \begin{bmatrix} p_1^T \\ p_2^T \end{bmatrix} \quad \text{Equation 4}$$

where $p_1, p_2 \in R^4$, and $$x_p = \frac{p_1^T X}{p_2^T X} \quad \text{Equation 5}$$

Equation 5 can be rewritten as $$(p_1 - x_p p_2)^T X = 0 \quad \text{Equation 6}$$

The P value may be known for a system from calibration, for example, when the system is assembled and leaves the production factory. However, due to external factors (barometric pressure, temperature, etc., displacing the projector 204 or its components with respect to the IR camera 202), the P value may vary such that Equation 6 may hold only approximately, resulting in the projector distortion effect described in reference to FIG. 2.

In order to compensate for this effect, a scaling correction (compensation) parameter ρ may be determined such that the new compensated projector coordinates $\rho x_p$ may satisfy Equation 6.

For example, for any point i on the object with coordinates $X^i$ a global scale ρ may be determined that may satisfy $$(p_1 - \rho x_p^i p_2)^T X^i = 0 \quad \text{Equation 7}$$

The corrected projector matrix may be calculated by scaling $$\tilde{p}_2 = \rho p_2 \quad \text{Equation 8}$$

Assuming that the RGB and IR cameras are positioned in such a way that they observe (approximately) the same view of the object (up to parallax effects), each pixel in the IR camera image $I_r$ may be mapped to the RGB camera image $I_c$ (for simplicity, assuming that it includes one channel, e.g. R, G or B, or is converted to grayscale), by means of a texture mapping function $(X_r) = X_c$, acting as a "geometric warping" of the RGB camera image. Accordingly, $I_c(U(X_r))$ may be aligned with $I_r(X_r)$, since in general the mapping is not restricted to integer grid positions of the pixels, interpolation can be employed.

The function $U = U_\rho$ implicitly depends on the projector correction (scaling) parameter ρ. Large projector distortion (equivalently, wrong ρ) may result in the misalignment of images $I_c(U(X_r))$ and $I_r(X_r)$. Having a set of corresponding points in the two images, the optimization problem over p may define that may align the images, e.g. in the sense of average misalignment at corresponding points:

$$\min_\rho \Sigma_i d(I_c(U_\rho(X_r^i)), I_r(X_r^i)) \quad \text{Equation 9}$$

where d is a distance between the corresponding pixels, expressing the degree of misalignment.

Optimization problem in Equation 9 may be solved, for example, by a search over a set of pre-defined values of ρ in a range chosen according to the possible projector distortion, selecting the value that may result in the smallest misalignment.

Figure 3:
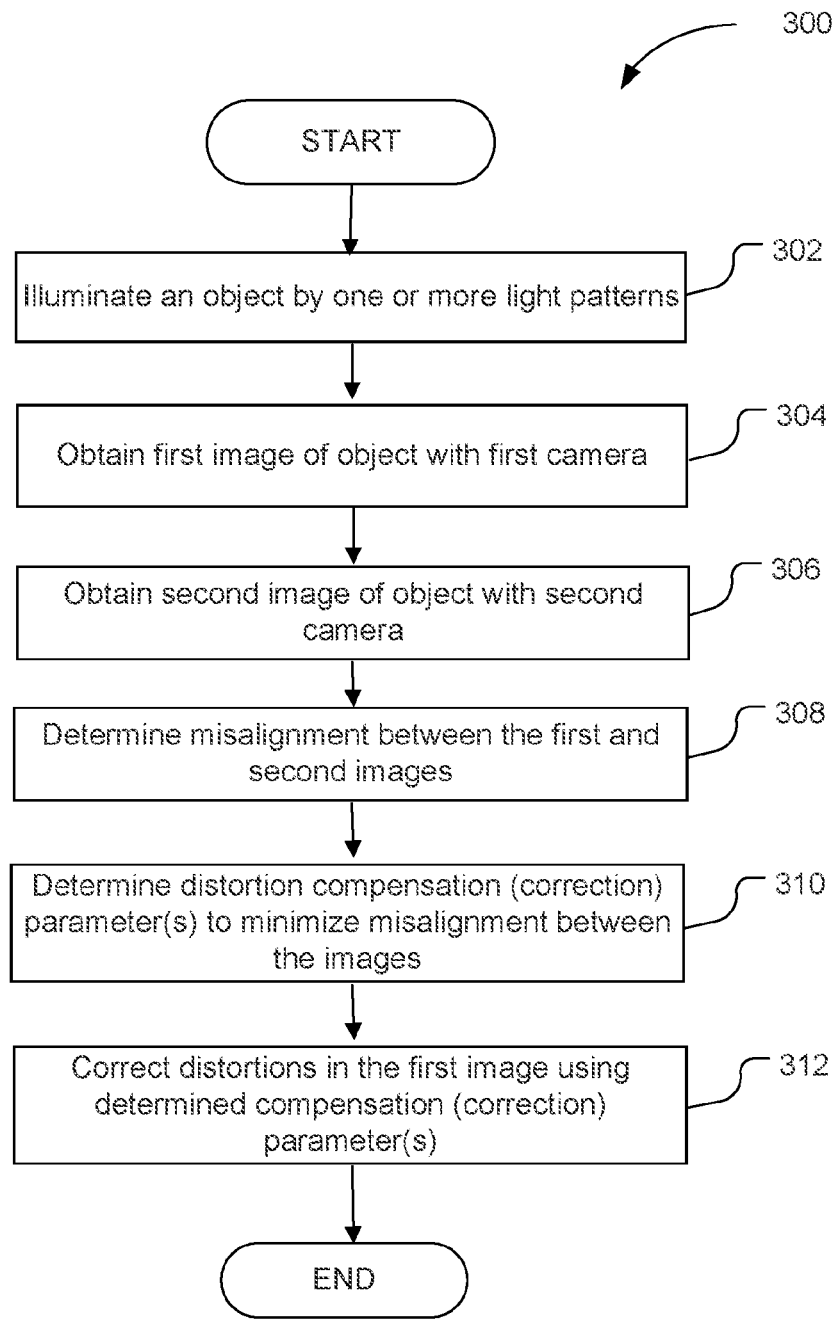
FIG. 3 is a process flow diagram for operation of the example optoelectronic assembly for 3D object acquisition and distortion compensation as described in reference to FIGS. 1 and 2, in accordance with some embodiments.

FIG. 3 is a process flow diagram for operation of the example optoelectronic assembly for 3D object acquisition and distortion compensation as described in reference to FIGS. 1 and 2, in accordance with some embodiments. Note that the process 300 does not have to be performed in a sequence described below. Some of the operations may be performed in parallel, and others may be performed in a different order, for example, blocks 304, 306, and 308 may be performed in parallel or in a different order. Accordingly, the process 300 is described as illustrative only and is not limiting to the present disclosure.

The process 300 may be triggered in a number of different ways. For example, the presence of distortions may be determined (e.g., by the controller 150) in the reconstructed object image. For example, the controller 150 may determine whether distortions of at least one of the reconstructed geometric parameters exceed a determined threshold. In some embodiments, the presence of distortion(s) may be determined externally. For example, the presence of distortions may be handled by a device component associated with the controller 150, e.g., software component configured to perform, for example, gesture tracking and analysis. If the performance of gesture tracking drops below a certain level (for example, the confidence of hand detection is determined to be below a pre-determined threshold), the controller 150 may trigger the distortion correction process 300 described below.

Additionally or alternatively, in some embodiments, the distortion correction process 300 may occur every time the example optoelectronic assembly or its components (e.g., camera) are turned on, or periodically, e.g., at every fixed time interval.

In some embodiments, the controller 150 may be configured to initiate distortion correction based on detecting that at least one of external parameters, such as barometric pressure, temperature, or humidity has exceeded a determined threshold. In some embodiments, the controller 150 may be configured to initiate distortion correction based on detecting that the projection angle of the projector 104 (204) has changed and the change exceeded a determined angle change threshold.

The process 300 may begin at block 302, where a projector unit (e.g., projector 104 or 204) may project light patterns on an object. For example, the project unit may illuminate the object by a sequence of light patterns as described in reference to FIG. 1.

At block 304, an image (first image) of the object may be obtained with a first camera (e.g., camera 102 or 202). The object image geometric parameters may be reconstructed (e.g., by the controller 150) using various techniques, such as epipolar geometry as described above.

At block 306, another (second) image of the object may be obtained with a second camera (e.g., camera 160 or 260).

At block 308, misalignment between the first and second images may be determined e.g. according to Equation 9.

At block 310, distortion compensation parameter(s) may be determined to minimize misalignment between the images, as described in reference to FIG. 2.

At block 312, the controller 150 may initiate a correction of distortions in the reconstructed object image (e.g., first image), based on comparing first and second images taken by the cameras 102 (202) and 160 (260), as described above.

In summary, the controller 150 may correct distortions in the reconstructed geometric parameters by comparing the second image with the first (reconstructed) image, determining and estimating a misalignment (mismatch) of corresponding features in the second image and the reconstructed image, and identifying at least one compensation parameter to be used in the reconstructed image to compensate for the misalignment (mismatch) as described in reference to FIG. 2.

Figure 4:
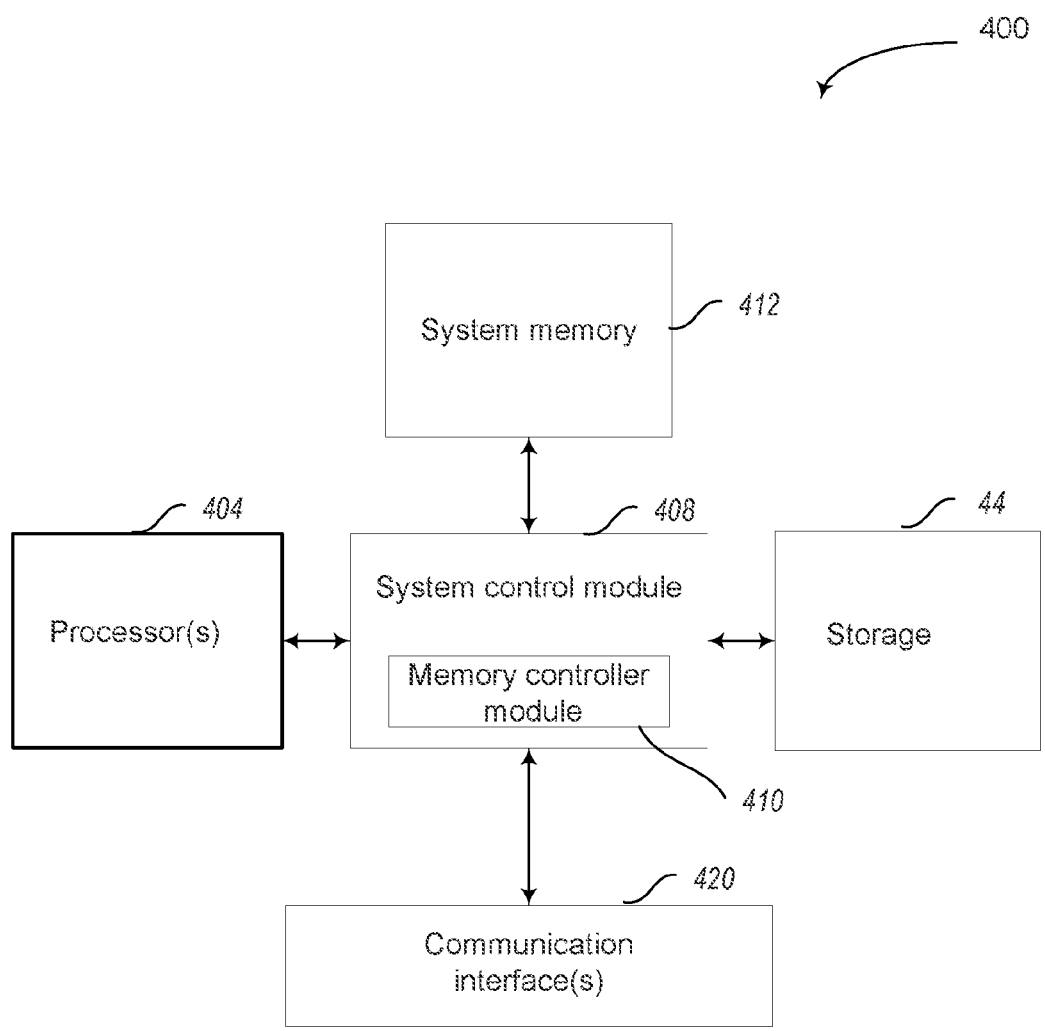
FIG. 4 schematically illustrates an example system that may be used to practice various embodiments described herein.

FIG. 4 schematically illustrates an example system that may be used to practice various embodiments described herein. More specifically, the example system of FIG. 4 may include an optoelectronic assembly for 3D object acquisition and distortion compensation as described in reference to FIGS. 1-3.

FIG. 4 illustrates, for one embodiment, an example system 400 having one or more processor(s) 404, system control module 408 coupled to at least one of the processor(s) 404, system memory 412 coupled to system control module 408, non-volatile memory (NVM)/storage 414 coupled to system control module 408, and one or more communications interface(s) 420 coupled to system control module 408. In some embodiments, the system 400 may include a device 100 or optoelectronic assembly 200 and provide logic/module that performs functions aimed at correcting distortions in a reconstructed object image described herein.

In some embodiments, the system 400 may include one or more computer-readable media (e.g., system memory or NVM/storage 414) having instructions and one or more processors (e.g., processor(s) 404) coupled with the one or more computer-readable media and configured to execute the instructions to implement a module to perform image distortion correction calculation actions described herein.

System control module 408 for one embodiment may include any suitable interface controllers to provide for any suitable interface to at least one of the processor(s) 404 and/or to any suitable device or component in communication with system control module 408.

System control module 408 may include memory controller module 410 to provide an interface to system memory 412. The memory controller module 410 may be a hardware module, a software module, and/or a firmware module. System memory 412 may be used to load and store data and/or instructions, for example, for system 400. System memory 412 for one embodiment may include any suitable volatile memory, such as suitable DRAM, for example. System control module 408 for one embodiment may include one or more input/output (I/O) controller(s) to provide an interface to NVM/storage 414 and communications interface(s) 420.

The NVM/storage 414 may be used to store data and/or instructions, for example. NVM/storage 414 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example. The NVM/storage 414 may include a storage resource physically part of a device on which the system 400 is installed or it may be accessible by, but not necessarily a part of, the device. For example, the NVM/storage 414 may be accessed over a network via the communications interface(s) 420.

Communications interface(s) 420 may provide an interface for system 400 to communicate over one or more network(s) and/or with any other suitable device. The system 400 may wirelessly communicate with the one or more components of the wireless network in accordance with any of one or more wireless network standards and/or protocols.

For one embodiment, at least one of the processor(s) 404 may be packaged together with logic for one or more controller(s) of system control module 408, e.g., memory controller module 410. For one embodiment, at least one of the processor(s) 404 may be packaged together with logic for one or more controllers of system control module 408 to form a System in Package (SiP). For one embodiment, at least one of the processor(s) 404 may be integrated on the same die with logic for one or more controller(s) of system control moduleb 408. For one embodiment, at least one of the processor(s) 404 may be integrated on the same die with logic for one or more controller(s) of system control module 408 to form a System on Chip (SoC).

In various embodiments, the system 400 may have more or less components, and/or different architectures. For example, in some embodiments, the system 400 may include one or more of a camera, a keyboard, liquid crystal display (LCD) screen (including touch screen displays), non-volatile memory port, multiple antennas, graphics chip, application-specific integrated circuit (ASIC), and speakers.

In various implementations, the system 400 may be, but is not limited to, a mobile computing device (e.g., a laptop computing device, a handheld computing device, a tablet, a netbook, etc.), a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the system 400 may be any other electronic device.

The embodiments described herein may be further illustrated by the following examples. Example 1 is an optoelectronic three-dimensional object acquisition assembly for correcting distortions in a reconstructed image of an object, comprising: a first device configured to project light patterns on an object; a second device configured to capture a first image of the object illuminated with the projected light patterns; a third device configured to capture a second image of the object illuminated with the projected light patterns; and a controller coupled to the first, second, and third devices and configured to reconstruct an image of the object from geometric parameters of the object obtained from the first image, and further configured to correct distortions in the reconstructed image caused by a variation of a determined angle of the light patterns projection by the first device, based at least in part on the first and second images of the object.

Example 2 may include the subject matter of Example 1, and further specifies that the first device comprises a projector configured to project one-dimensional coded light patterns on the object.

Example 3 may include the subject matter of Example 2, and further specifies that the projector includes at least one micro-electro-mechanical systems (MEMS) mirror configured to reflect a laser line generated by a laser arrangement coupled with the projector, during pre-determined time intervals, to project the one-dimensional coded light patterns resulted from the tiltable reflection.

Example 4 may include the subject matter of Example 3, and further specifies that the second device comprises a digital IR camera configured to capture the second image during a sensing cycle of the digital IR camera.

Example 5 may include the subject matter of Example 4, and further specifies that the third device comprises a digital camera having a resolution that is different than a resolution of the second device and configured to capture a texture image of the object in the second image.

Example 6 may include the subject matter of Example 5, and further specifies that the first device comprises an infrared (IR) projector, the second device comprises an IR camera, and the third device comprises multi-chromatic camera, including a red, green, and blue (RGB) camera.

Example 7 may include the subject matter of Example 5, and further specifies that the controller is configured to correct distortions in the reconstructed geometric parameters by comparing the texture image with the reconstructed image, determining a mismatch of corresponding features in the texture image and the reconstructed image, and identifying at least one correction parameter to be used in the reconstructed image to compensate for the mismatch.

Example 8 may include the subject matter of Example 7, and further specifies that the controller is further configured to estimate a misalignment in the texture image caused by the variation of the determined angle of the light pattern projection, compute a displacement of the geometric parameters of the reconstructed image of the object caused by the misalignment, and compensate the reconstructed geometric parameters for the computed displacement.

Example 9 may include the subject matter of Example 1, and further specifies that the controller is further configured to correct distortions in the reconstructed image periodically.

Example 10 may include the subject matter of Example 1, and further specifies that the controller is further configured to initiate a correction of distortions in the reconstructed image in response to a determination that a distortion of at least one of the geometric parameters exceeds a determined threshold.

Example 11 may include the subject matter of any of Examples 1 to 10, and further specifies that the distortions are caused by at least one of: a change of barometric pressure, temperature, or humidity, or displacement of the first device.

Example 12 is an optoelectronic three-dimensional object acquisition assemblyfor correcting distortions in a reconstructed image of an object, comprising: a first device configured to capture a first image of an object; a second device configured to capture a second image of the object; a third device configured to capture a third image of the object; and a controller coupled to the first, second, and third devices and configured to reconstruct an image of the object from geometric parameters of the object obtained from the first and second images, and further configured to correct distortions in the reconstructed image caused by a displacement of the first device, based at least in part on the first, second, and third images of the object.

Example 13 may include the subject matter of Example 12, and further specifies that the first and second devices comprise digital infrared (IR) camera configured to capture the first and second images during respective sensing cycles of the digital IR cameras.

Example 14 may include the subject matter of Example 12, and further specifies that the third device comprises a multi-chromatic camera having a resolution that is different than a resolution of the second device and configured to capture a pre-calibrated texture image of the object in the second image.

Example 15 may include the subject matter of Example 12, and further specifies that the controller is configured to obtain the geometric parameters of the object using epipolar geometry techniques.

Example 16 may include the subject matter of any of Examples 12 to 15, and further specifies that the controller is further configured to correct distortions in the reconstructed image of the object by aligning the reconstructed image of the with the third image and determining a mismatch of corresponding features in the reconstructed image and the third image.

Example 17 is a method for correcting distortions in a reconstructed image of an object, comprising: obtaining, by a controller coupled with a three-dimensional object acquisition assembly, a first image of an object captured with a first camera included in the three-dimensional object acquisition assembly, the image captured during a projection of a light pattern on the object at a determined angle with a projector included in the three-dimensional object acquisition assembly; obtaining, by the controller, a second image of the object captured with a second camera included in a three-dimensional object acquisition assembly; and reconstructing, by the controller, an image of the object from geometric parameters of the object obtained from the first image, wherein the reconstructing includes correcting, by the controller, distortions in the reconstructed image based at least in part on the first and second images of the object, the distortions caused by a variation of the determined angle of the light pattern projection by the projector.

Example 18 may include the subject matter of Example 17, and further specifies that the method further comprises: first determining, by the controller, whether distortions of at least one of the geometric parameters exceed a determined threshold; and second determining, by the controller, to initiate the correcting distortions based on a result of first determining.

Example 19 may include the subject matter of Example 17, and further specifies that the projector comprises an infrared (IR) projector, the first camera comprises an IR digital camera, and the second camera comprises a multi-chromatic camera, including a digital red, green, and blue (RGB) camera.

Example 20 may include the subject matter of any of Examples 17 to 19, and further specifies that the correcting distortions in the reconstructed image includes: comparing, by the controller, the reconstructed image with the second image; determining, by the controller, a mismatch of corresponding features in the reconstructed image and the second image; and identifying, by the controller, at least one correction parameter to be used in the reconstructed image to compensate for the mismatch.

Various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system using any suitable hardware and/or software to configure as desired.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An optoelectronic three-dimensional object acquisition assembly, comprising:
   a first device to project light patterns on an object;
   a second device to capture a first image of the object illuminated with the projected light patterns;
   a third device to capture a second image of the object illuminated with the projected light patterns; and
   a controller coupled to the first, second, and third devices, to correct distortions in a reconstructed image of the object caused by a variation of a determined angle of the light patterns projection by the first device, based at least in part on the first and second images of the object, in response to a determination that a distortion of at least one of geometric parameters obtained from the first image of the object exceeds a determined threshold, wherein the reconstructed image of the object is based at least in part on the first image of the object.

2. The assembly of claim 1, wherein the third device comprises a digital camera having a resolution that is different than a resolution of the second device, to capture a texture image of the object in the second image.

3. The assembly of claim 2, wherein the controller is to compare the texture image with the reconstructed image, determine a mismatch of corresponding features in the texture image and the reconstructed image, and identify at least one correction parameter to be used in the reconstructed image to compensate for the mismatch.

4. The assembly of claim 3, wherein the corresponding features include distances between corresponding points in the texture image and the reconstructed image, wherein the distances are indicative of a degree of misalignment of the corresponding points.

5. The assembly of claim 1, wherein the controller is to reconstruct the image of the object from the geometric parameters of the object obtained from the first image of the object, prior to the distortion correction of the image of the object.

6. The assembly of claim 1, wherein the first device comprises a projector to project one-dimensional coded light patterns on the object.

7. The assembly of claim 6, wherein the projector includes at least one micro-electro-mechanical systems (MEMS) mirror to reflect a laser line generated by a laser arrangement coupled with the projector, during pre-determined time intervals, to project the one-dimensional coded light patterns resulted from a tiltable reflection.

8. The assembly of claim 7, wherein the second device comprises a digital infrared (IR) camera to capture the first image during a sensing cycle of the digital IR camera.

9. The assembly of claim 6, wherein the projector comprises an infrared (IR) projector, the second device comprises an IR camera, and the third device comprises a multi-chromatic camera, including a red, green, and blue (RGB) camera.

10. The assembly of claim 9, wherein the controller is further to estimate a misalignment in a texture image caused by the variation of the determined angle of the light pattern projection, compute a displacement of geometric parameters of the reconstructed image of the object caused by the misalignment, and compensate the reconstructed geometric parameters for the computed displacement.

11. The assembly of claim 1, wherein the controller is further to correct distortions in the reconstructed image periodically.

12. An optoelectronic three-dimensional object acquisition assembly, comprising:
    a first device to capture a first image of an object;
    a second device to capture a second image of the object;
    a third device to capture a third image of the object; and
    a controller coupled to the first, second, and third devices, to correct distortions in a reconstructed image of the object caused by a variation of a determined angle of a light patterns projection on the object, based at least in part on the first and second images of the object, in response to a determination that a distortion of at least one of geometric parameters obtained from the first image of the object exceeds a determined threshold, wherein the reconstructed image of the object is based at least in part on the first image of the object.

13. The assembly of claim 12, wherein the controller is to reconstruct the image of the object from geometric parameters of the object obtained from the first and second images.

14. The assembly of claim 12, wherein the first and second devices comprise digital infrared (IR) cameras to capture the first and second images during respective sensing cycles of the digital IR cameras.

15. The assembly of claim 14, wherein the third device comprises a multi-chromatic camera having a resolution that is different than a resolution of the first or second device, to capture a pre-calibrated texture image of the object in the third image.

16. The assembly of claim 12, wherein the controller is to obtain the geometric parameters of the object using epipolar geometry techniques.

17. The assembly of claim 12, wherein the controller is further to correct distortions in the reconstructed image of the object through alignment of the reconstructed image of the third image and determination of a mismatch of corresponding features in the reconstructed image and the third image.

18. A method for correcting distortions in a reconstructed image of an object, comprising:
   obtaining, by a controller coupled with a three-dimensional object acquisition assembly, a first image of an object captured with a first camera included in the three-dimensional object acquisition assembly, the image captured during a projection of a light pattern on the object at a determined angle with a projector included in the three-dimensional object acquisition assembly;
   obtaining, by the controller, a second image of the object captured with a second camera included in a three-dimensional object acquisition assembly;
   determining, by the controller, that a distortion of at least one of geometric parameters obtained from the first image of the object exceeds a determined threshold; and
   correcting, by the controller, distortions in a reconstructed image of the object caused by a variation of a determined angle of the light patterns projection by the projector on the object, based at least in part on the first and second images of the object, and in response to a result of determining, wherein the reconstructed image of the object is based at least in part on the first image of the object.

19. The method of claim 18, further comprising:
   obtaining, by the controller, the geometric parameters from the first image; and
   reconstructing, by the controller, the image of the object from the geometric parameters of the object obtained from the first image.

20. The method of claim 18, wherein the projector comprises an infrared (IR) projector, the first camera comprises an IR digital camera, and the second camera comprises a multi-chromatic camera, including a digital red, green, and blue (RGB) camera.

21. The method of claim 18, wherein correcting distortions in the reconstructed image includes:
   comparing, by the controller, the reconstructed image with the second image;
   determining, by the controller, a mismatch of corresponding features in the reconstructed image and the second image; and
   identifying, by the controller, at least one correction parameter to be used in the reconstructed image to compensate for the mismatch.

* * * * *